US009322740B2

(12) United States Patent
Liu et al.

(10) Patent No.: US 9,322,740 B2
(45) Date of Patent: Apr. 26, 2016

(54) DISTRIBUTED DISTURBANCE SENSING DEVICE AND THE RELATED DEMODULATION METHOD BASED ON POLARIZATION SENSITIVE OPTICAL FREQUENCY DOMAIN REFLECTOMETRY

(75) Inventors: Tiegen Liu, Tianjin (CN); Kun Liu, Tianjin (CN); Zhenyang Ding, Tianjin (CN); Junfeng Jiang, Tianjin (CN); Dingjie Li, Tianjin (CN)

(73) Assignee: TIANJIN UNIVERSITY, Tianjin (CN)

( * ) Notice: Subject to any disclaimer, the term of this patent is extended or adjusted under 35 U.S.C. 154(b) by 18 days.

(21) Appl. No.: 13/880,732

(22) PCT Filed: Dec. 16, 2011

(86) PCT No.: PCT/CN2011/084101
§ 371 (c)(1),
(2), (4) Date: Apr. 20, 2013

(87) PCT Pub. No.: WO2013/023425
PCT Pub. Date: Feb. 21, 2013

(65) Prior Publication Data
US 2014/0176937 A1    Jun. 26, 2014

(30) Foreign Application Priority Data
Aug. 18, 2011    (CN) .......................... 2011 1 0237417

(51) Int. Cl.
*G01M 11/00* (2006.01)
*G01D 5/353* (2006.01)
*G01H 9/00* (2006.01)

(52) U.S. Cl.
CPC ....... *G01M 11/3172* (2013.01); *G01D 5/35325* (2013.01); *G01D 5/35329* (2013.01); *G01D 5/35354* (2013.01); *G01M 11/3181* (2013.01); *G01H 9/004* (2013.01)

(58) Field of Classification Search
None
See application file for complete search history.

(56) References Cited

U.S. PATENT DOCUMENTS

| | | | | |
|---|---|---|---|---|
| 5,844,235 A * | 12/1998 | Tachikawa et al. | ...... | 250/227.14 |
| 7,019,838 B2 * | 3/2006 | Izatt et al. | ...... | 356/479 |
| 7,920,271 B2 * | 4/2011 | Vakoc et al. | ...... | 356/479 |
| 7,936,462 B2 * | 5/2011 | Jiang et al. | ...... | 356/497 |
| 8,259,303 B2 * | 9/2012 | Johnson et al. | ...... | 356/479 |
| 2006/0244973 A1 * | 11/2006 | Yun et al. | ...... | 356/511 |
| 2007/0008545 A1 * | 1/2007 | Feldchtein et al. | ...... | 356/479 |
| 2007/0109553 A1 * | 5/2007 | Feldchtein et al. | ...... | 356/492 |
| 2007/0236700 A1 * | 10/2007 | Yun et al. | ...... | 356/491 |
| 2008/0002187 A1 * | 1/2008 | Froggatt | ...... | 356/73.1 |
| 2008/0024785 A1 * | 1/2008 | Froggatt et al. | ...... | 356/450 |
| 2009/0008536 A1 * | 1/2009 | Hartog et al. | ...... | 250/227.14 |
| 2010/0134783 A1 * | 6/2010 | Omichi et al. | ...... | 356/33 |
| 2014/0140691 A1 * | 5/2014 | Reaves et al. | ...... | 398/21 |

* cited by examiner

*Primary Examiner* — Gordon J Stock, Jr.
(74) *Attorney, Agent, or Firm* — George G. Wang; Bei & Ocean

(57) ABSTRACT

This invention relates to a distributed disturbance sensing device based on polarization sensitive optical frequency domain reflectometry (OFDR) and the related demodulation thereof. The device, adopting OFDR, polarization controlling and analysis techniques, consists of a ultra-narrow linewidth tunable laser source module, polarization generating and polarization splitting balanced detecting module, laser source optical frequency and phase monitoring module, high-speed optical switch and so on to establish a large-scale and long-distance optical sensing network. The demodulation method consists of analysis the polarization information from sensing optical fiber, the method of suppressing and compensating of the non-linear optical frequency and the laser phase noise, super-resolution analyzing, advanced denoising method and the polarization information analysis method based on Jones and Mueller's matrices using distributed wave plate model of optical fiber.

4 Claims, 5 Drawing Sheets

DISTRIBUTED DISTURBANCE SENSING DEVICE AND THE RELATED DEMODULATION METHOD BASED ON POLARIZATION SENSITIVE OPTICAL FREQUENCY DOMAIN REFLECTOMETRY

FIELD OF THE INVENTION

The present invention belongs to the field of the optical fiber sensing, which is applicable for the distributed disturbance and stress sensing of long-distance. The invention relates to a distributed disturbance sensing device and the related demodulation method based on polarization sensitive optical frequency domain reflectometry.

BACKGROUND OF THE INVENTION

At present, the techniques applying to the distributed disturbance and stress sensing of long-distance have some methods such as the laser interference method, phase sensitivity optical time-domain reflectometry method and polarization sensitivity optical time-domain reflectometry method. All these traditional methods have been limited to sensing distance less than 80 km, the low spatial resolution (>10 m), discrete single points and so on.

This invention combines the techniques of the polarization feature analysis and controlling with the Optical Frequency Domain Reflectometry (OFDR), and provides a polarization sensitive OFDR(P-OFDR) technique and the related device and related demodulation method.

OFDR technique presently known have been used in the field of optical fiber communication network testing disturbed stress and temperature sensing, etc., OFDR technique use the high-coherent laser to achieve high-speed and linear wavelength scanning, and the reference arm is coherent by the reflected light of Faraday reflector and single-mode optical fiber backscattering light (i.e. Rayleigh reflected light). Since the two lights have different optical paths, the two arm lights with different frequency are interfered to form beat-frequency at the interference end. The beat inference in the interferometer between the testing light (such as Rayleigh backscattering) and reference light. By using Fast Fourier Transform (FFT) to process detecting the beat-frequency signals, the backscattering information in different position of the sensing optical fiber can be obtained and then the sensing values can be obtained distributed backscattering information.

SUMMARY OF THE INVENTION

The present invention aims at solving the problems of the prior art such as short sensing distance (<80 km), low spatial resolution (large than 10 m), single point discrete, etc., and provides a distributed disturbance sensing device and the related demodulation method based on polarization sensitive optical frequency domain reflectometry.

The principle of the invention is described as follows:

The disturbed sensing method based on polarization sensitivity optical frequency domain reflectometry combines of the OFDR method, polarization sensitivity disturbance sensing method and disturbance sensing based on the variation of Rayleigh backscattering information method.

Compared with traditional OFDR system, this invention adds the laser optical frequency and phase monitoring module to the system, and adds phase modulation in the reference arm to the core interference module. The invention reduces the phase noise and non-linear tuning of the laser source, and coherence fading noise by using corresponding demodulation algorithms to achieve high sensitivity and high signal-to-noise ratio.

The principle of disturbed sensing method based on polarization sensitivity optical frequency domain reflectometry and is based on photoelastic effect. When external disturbance (e.g. vibration and stress) occurs on the sensing optical fibers, the porization information (such as birefringence) and Rayleigh backscattering information of the sensing fiber can be changed. In disturbance sensing using porization information, the polarization sensitive OFDR (P-OFDR) sends several polarized light beams with known polarization states to the communication optical fibers, and obtains the polarization information of optical fiber at individual positions by using polarization-diversity detecting technique and the optical heterodyne coherence detecting technique of the OFDR. In addition, this method is capable of obtaining the polarization information at each segment of the optical fiber and the disturbing sensing is thus achieved by the polarization information.

The invented device adopts polarization generating module and polarization splitting balanced detecting module, which can send two to four polarized light beams with known polarization states to the sensing optical fibers, wherein the polarized lights comprises linear polarized light, 45° linear polarized light, left-handed circular polarized light and right-handed circular polarized light. The polarization information at each segment of the optical fiber can be obtained by using polarization eigen state acquisition of the polarization splitting balanced detecting module, the concatenate wave plate model and Jones Matrix/Mueller Matrix algorithms, Thus, the invention realizes distributed disturbance sensing from the interaction between the obtained polarization parameters at each segment of the optical fiber (e.g. linear birefringence, polarization-dependent loss, and circuit birefringence) and the external disturbance (e.g. stress and vibration).

The invented device extends sensing range and establishes a super-long range sensing network.

The distributed disturbance sensing device based on polarization sensitive optical frequency domain reflectometry is shown in FIG. 1, and the detailed implements are shown in FIG. 2 and FIG. 3. The device consists of:

1. Core interference module with Mach-Zehnder structure: it produces beat-frequency interference between the backscattering light of the sensing optical fibers and the reference light; wherein the reference arm uses a phase modulator (e.g. EOM), which driven by Field programmable gate array (FPGA) modulation, to generate the frequency shift. The value of the frequency shift is larger than the maximum beat-frequency generated by the testing optical fiber. The receiving end performs denoising by band-pass filter and decreases the frequency with a frequency mixer. This is convenient for the acquisition card receiving the suppressed Rayleigh scattering coherent noises (i.e. Fading noise) and ghost peaks;

2. Laser optical frequency and phase monitoring module: laser has phase noise and optical frequency non-linear tuning, which results in low spatial resolution and signal-to-noise ratio. In order to overcome these weaknesses, this invention employs a depolarized Michelson interferometer structure, which performs phase modulation with a modulator, demodulates the phase of the interference signal with phase-lock demodulation, and extracts the optical frequency and phase of the laser within the whole timeframe. Finally, correction and compensation algorithm is used to solve phase noise and optical frequency non-linear tuning of the laser. Moreover, the Mach-Zehnder interferometer structure based 3×3 coupler can also be adopted to solve the same problem.

Using trigonometric functions to manipulate the 120° phase difference from the interface of the 3×3 coupler and the signal from the interface of the two-way 3×3 coupler, the optical frequency and phase information at each time interval of the laser can be obtained.

3. Polarization generating module: it produces several fixed polarization states, for the convenience of resolving the following polarization demodulation.

4. Polarization splitting balanced detecting module: it splits the light to the module into two orthogonal states and collects the light beams with two orthogonal states. This module reduces the polarization fading and obtain the polarization information, whereas the balanced detecting module reduces the common-mode noise and increase the SNR of 3 dB.

5. Tunable laser source driving module: it provides driving signal to the tunable light source, consisting of a programmable Gate array (FPGA) and a 20-bit DAC.

6. Tunable laser source: it provides continuous linear polarized light with ultra-narrow linewidth and is linear tuning with high-speed.

7. High-speed optical switch: it is used to switch sensing optical fibers, which is able to extend the sensing distance and establish extremely long distance sensing network.

8. High-speed acquisition module: it is used for collecting the signal generated from the core interference module and the laser optical frequency and phase monitoring module for performing high-speed synchronous acquisition.

9. Computer: it is used for demodulating the data from the high-speed acquisition module.

10. Sensing optical fibers: the sensing optical fibers are either common communication single-mode fiber or vibrating sensing optical fiber, and the fiber is implement in fence and large-scale civil structures for disturbance monitoring.

The detailed composition and the connecting mode of the modules of the sensing device are shown in FIG. 2.

Tunable laser source 6: it is used for providing light source for OFDR system, which is either ultra-narrow linewidth tunable optical fiber laser or external cavity semiconductor laser;

Tunable light source driving module 5: it connects with the tunable laser and is used for providing tuning driving to the tunable laser, which is a ultra low-ripple voltage driver and consists of a high-precision D/A convertor, a programmable Gate array and an amplifier;

Optical splitter 12 with splitting ratio of 1:99; it splits the emergent light of laser according to the splitting ratio of 1:99, distributes the light to the core interference module 1 and the source optical frequency and phase monitoring module 2;

Source optical frequency and phase monitoring module 2: it is used for collecting and monitoring the optical frequency of the laser, which is either Michelson interferometer structure or the Mach-Zehnder interferometer structure based 3×3 coupler (FIG. 3). The depolarized Michelson interferometer comprises isolator 13 that is used for preventing the reflected light of the second port of coupler 15 with the splitting ratio of 50:50 from traveling into the laser. Coupler 15 with the splitting ratio of 50:50 is used for interfering the light. The light goes into the second port of coupler 15 with the splitting ratio of 50:50, and emits from the third and forth port. Then the lights are reflected by Faraday rotating mirrors 17 and 18 mounted on the two arms of the Michelson interferometer respectively, and return to the third and forth port. The two light beams interfere in coupler 15, then the lights output from the first port. Faraday rotating mirrors 17 and 18 provide reflectometry for the interferometer, and eliminate the polarization fading phenomena of the interferometer. Optical delay fiber 16 is used for unequal armed beat-frequency interference, which can obtain the optical frequency according to the beat-frequency and the length of the optical delay fiber. Interference detector 14 is used for collecting the emergent light emitted from the first port of coupler 15, namely the beat-frequency signal of the source optical frequency and phase monitoring module. Phase modulator 19 is used for phase modulating one arm of the interferometer, for phase-lock demodulating the phase of the interference signal. The Mach-Zehnder interferometer structure based 3×3 coupler is shown in FIG. 3, it comprises splitter 33 with ratio of 50:50, which is used for splitting the incident light at ratio of 50:50. Then the lights travel through optical delay fiber 34 into 3×3 coupler 35 for interfering. The two ports of the 3×3 coupler access to the optical interfaces of detectors 36 and 37, respectively, and the collected electric signal is transmitted into the high-speed collecting module.

Core interference module 1: it is the core of the optical frequency domain reflectometer, consisting of tunable polarization-maintaining attenuator 20, polarization-maintaining splitter 21, reference arm, test arm and polarization-maintaining coupler 24; wherein tunable polarization-maintaining attenuator 20 is used for adjusting the light intensity, polarization-maintaining splitter 21 distributes the light to the reference arm and test arm of the interferometer according to the one of the following ratios of 50:50, 20:80, 30:70 or 40:60. A high ratio (e.g. 20:80 or 30:70) is chosen when the testing optical fiber is highly affected by the Brillouin absorption, otherwise a low ratio (e.g. 50:50 or 40:60) is recommended.

The reference arm consists of phase modulator 22 and 45° aligner 23, wherein the reference arm fiber is polarization-maintaining fiber. Phase modulator 22 takes the maximum beat frequency as the modulation frequency, modulates signal via programmable gate array 31, and high-pass filters the collected signal to reduce Rayleigh scattering coherent noises (namely Fading noise) and ghost peaks. 45-degree aligner 23 is used for aligning the shaft of the fast and slow axis of the polarization-maintaining fiber to ensure the fast and slow axis of the reference arm having equal light intensity.

The test arm of core interference module 1: it connects to polarization generator 38 of polarization generating module 3. The back scattering light of sensing optical fibers 10 and 11 travel through high-speed optical switch 7 and the circulator of polarization generating module 3 into the second port of polarization-maintaining coupler 24. The reference arm light of core interference module 1 goes into the first port of polarization-maintaining coupler 24. The back scattering light of sensing optical fibers 10 and 11 and the reference arm light form beat-frequency interference in polarization-maintaining coupler 24, and generates beat-frequency signal that goes through the third and forth port of polarization-maintaining coupler 24 into polarization splitting balanced detecting module 4;

Polarization generating module 3: it consists of polarization generator 38 and circulator 29, wherein polarization generator 38 produces several fixed polarization state lights, including linear polarized light, 45-degree linear polarized light, left-handed or right-handed circular polarized light; the polarization generator provides existing reference polarization state for following algorithms; the circulator 29 is a dual-axis polarization-maintaining circulator, which is used for connecting polarization generator 38, high-speed optical switch 7 and polarization-maintaining coupler 24 of core interference module 1. The detailed connecting method is as follows: the light goes through the first port into the circulator, and goes through the second port into high-speed optical switch 7, then the back scattering light of the sensing fibers, connected to the high-speed optical switch returns back through the second port of the circulator, goes through the third port of the circulator into the first and second port of polarization-maintaining coupler 24 of the core interference module 1.

High-speed optical switch 7: it links sensing optical fibers 10 and 11, which realizes the sensing of the multiplexed sensing optical fibers, extends the testing distance of the system and is convenient for establishing large-scale sensing networks;

Polarization splitting balanced detecting module 4: it consists of polarization splitters 25 and 26 and balanced detectors 27 and 28; wherein, polarization splitters 25 and 26 split the beat-frequency signal outputted from core interference module 1 into two components of the fast and slow axes with orthogonally polarized property. Wherein, the fast axis component of polarization splitters 25 and 26 goes into the first balanced detector 27, and the slow axis component goes into the second balanced detector 28;

High-speed collecting module 8: it is used for collecting the interference signals transmitted from the first balanced detector 27 and the second balanced detector 28 of the polarization splitting balanced detecting module, detector 14 (the first structure) or detectors 36 and 37 (the second structure) of the source optical frequency and phase monitoring module.

Computer 9: the computer processes the signal data collected by high-speed collecting module 8, which extracts the phase and the optical frequency of source optical frequency and phase monitoring module 2, provides demodulating algorithm, demodulates the beat-frequency signal generated by core interference module 1, and supplies control signal for tunable light source driving module 5;

Sensing optical fibers 10 and 11: the sensing optical fibers are either common communication cable or the vibrating sensing optical fibers with single core. The sensing optical fibers are deployed in the disturbance monitoring positions, such as fence, large-scale structure, etc.

4. A demodulation method of distributed disturbance sensing device based on polarization sensitive optical frequency domain reflectometry, wherein the steps of the method are as follows:

Step 1: collecting the real-time optical phase or optical frequency of the laser, performing some data process algorithms such as Hilbert transformation, trigonometric function transformation, and time-frequency domain transformation to process the signal collected by the laser optical frequency and phase monitoring module, in order to obtain the optical frequency or phase information of the laser in each time point;

Step 2: using the signal of the laser's optical frequency and phase signal collected at Step 1, and adopting the compensation algorithm (such as Non-uniform Fast Fourier Transform (NUFFT), phase noise compensation algorithm based on Residual Video Phase filter, etc.) to compensate the two orthogonal polarization signals of the core interference module for reducing the influence on signal-to-noise ratio of the system and the spatial resolution due ro the nonlinear optical frequency and the phase noise of the laser;

Step 3: performing spectral analysis to the signals of the core interference module compensated at Step 2, by either non-parametric or parametric spectral estimation. The non-parametric estimating method employs Kaiser or Gaussian's window function to reduce side lobes of the signal compensated at Step 2, then further processes the signal using convolution window and spatial apodization, or apodization alone. The parametric estimating adopts Auto-Regressive-Moving-Average (ARMA) model or Auto-Regressive model or the other parametric methods such as the multiple signal classification method to the signal compensated at Step 2 for modeling the output signal of the system, in order to achieve super resolution analysis of the system;

Step 4: denoising the signal processed at Step 3, using wavelet denoising, or Wiener deconvolution adaptive denoising, or median denoising, or Morphology denoising, or partial differential denoising, or the denoising based on the local statistical features; the signal shown in FIG. 4 does not adopt advanced window techniques for reducing side lobes of the signal described in Step 3, the signal shown in FIG. 5 adopts advanced window techniques for reducing side lobes of the signal described in Step 3 and denoising process described in step 4.

Step 5: adopting either of the following two polarization analysis methods to perform polarization calculation to the signal processed at Step 4, wherein the polarization calculation based on the optical fibers equivalent to multiple wave plates concatenation model:

Method A: The polarization state and Jones vector of the input and output lights are detected by the polarization generator and polarization beam splitter. The eigen value of the Jones Matrix is obtained using similar matrix. Inputting two orthogonal polarization states to the polarization generating module, Jones Matrix of each segment in the testing fiber can be calculated, namely linear birefringence, linear double-attenuation and circular birefringence are obtained;

Method B: the Stokes vector of the input and output lights are detected by the polarization generator and polarization splitter. The distributed Mueller Matrix of the each segment in the testing fiber are obtained after matrix calculation, namely the linear birefringence, linear double-attenuation and the circular birefringence are obtained.

The advantages of the invention

This invention provides a distributed disturbance sensing device based on polarization sensitive optical frequency domain reflectometry (P-OFDR) which has the advantages of long testing distance (>200 km), high spatial resolution (up to centimeter), high sensitivity, continuous multi-point sensing and so on. The invention is applicable for security real-time monitoring of the electric power and communication cable, long distance peripheral security, oil and gas pipeline security, etc.

In these figures, 1 is the core interference module, 2 is the source optical frequency and phase monitoring module, 3 is the polarization generating module, 4 is the polarization splitting balanced detecting module, 5 is the tunable light source driving module, 6 is the tunable laser source, 7 is the high-speed optical switch, 8 is the high-speed acquisition module, 9 is the computer, 10 and 11 are the sensing fibers, 12 is the splitter (the ratio is of 1:99), 13 is the isolator, 14 is the detector, 15 is the coupler, 16 is the latency optical fiber, 17 and 18 are the Faraday rotating mirrors, 19 is the phase modulator, 20 is the tunable polarization-maintaining attenuator, 21 is the polarization-maintaining splitter, 22 is the phase modulator, 23 is the 45-degree aligner, 24 is the polarization-maintaining coupler, 25 and 26 are the polarization splitters, 27 is the first balanced photo detector, 28 is the second balanced photo detector, 29 is the polarization-maintaining circulator, 30 is the high-precision D/A convertor, 31 is the Field programmable Gate array (FPGA), 32 is the amplifier, 33 is the splitter with ratio of 50:50, 34 is the optical delay fiber, 35 is the 3×3 coupler, 36 is the photo detector 1, 37 is the photo detector 2, 38 is the polarization state generator.

DETAILED DESCRIPTION OF PARTICULAR EMBODIMENTS OF THE INVENTION

Embodiment 1: Distributed P-OFDR Disturbing Sensing Device

Figure 1:
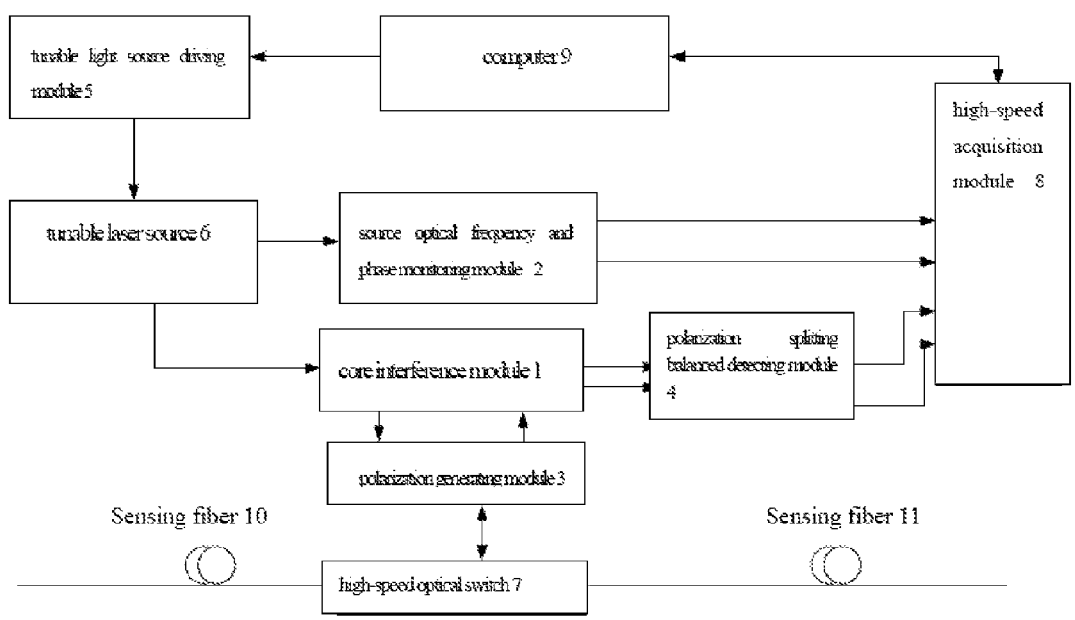
FIG. 1 is a schematic diagram of the distributed disturbing sensing device based on P-OFDR of the present invention, wherein 1 is the core interference module, 2 is the laser optical frequency and phase monitoring module, 3 is the polarization generating module, 4 is the polarization splitting balanced detecting module, 5 is the tunable light source driving module, 6 is the tunable laser source, 7 is the high-speed optical switch, 8 is the acquisition module, 9 is the computer, 10 and 11 are the sensing fibers.

As shown in FIG. 1, the basic structure of core interference module 1 is the Mach-Zehnder interferometer structure, which forms the optical heterodyne interferometry structure; the source optical frequency and phase monitoring module 2 mainly real-time collect the optical frequency and the phase position of the laser, which is used for performing non-linear scanning and phase noise compensation for the signal of the core interference module; polarization generating module 3 and polarization splitting balanced detecting module 4 collect the polarization information of the sensing fiber; tunable light source driving module 5 and tunable laser 6 provide narrow linewidth laser resource with high-speed and linear scanning wavelength to the distributed P-OFDR disturbing sensing device; high-speed optical switch 7 is used for forming the long-distance and large-scale sensing networks; high-speed collecting module 8 is used for collecting the signal of core interference module 1 and the source optical frequency and phase monitoring module 2; computer 9 is used for demodulating and data processing the signal collected by the high-speed collecting module, and finally obtaining the distributed disturbing information (e.g. vibration, stress) on the sensing fiber; sensing optical fiber 10 and 11 are composed of common communication cables or vibrating sensing optical fibers with single core. The sensing optical fibers are deployed in the disturbance monitoring positions like fence, large-scale structure, etc.

Figure 2:
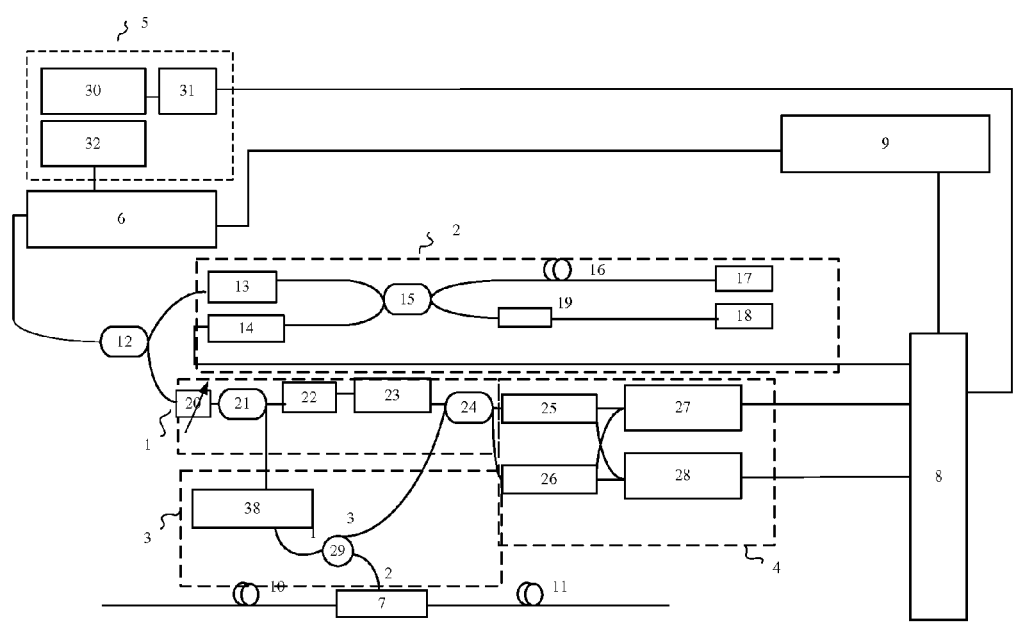
FIG. 2 is a detailed configuration diagram of the distributed disturbing sensing device based on P-OFDR of the present invention.
Figure 3:
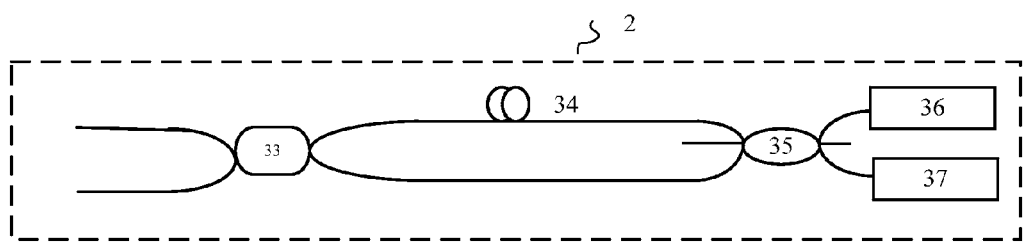
FIG. 3 is the configuration diagram of the second structure of the laser optical frequency and phase monitoring module of the distributed disturbing sensing device based on P-OFDR of the present invention, namely, the Mach-Zehnder interferometer structure based 3×3 coupler.

FIG. 2 and FIG. 3 are the detailed embodiments of the functional modules in FIG. 1, which comprise the connections and compositions of the modules.

The detailed composition and the connecting mode of the modules of the sensing device are shown in FIG. 2.

Tunable laser source 6: it is used for providing light source for OFDR system, which is either ultra-narrow linewidth tunable optical fiber laser or external cavity semiconductor laser;

Tunable light source driving module 5: it connects with the tunable laser and is used for providing tuning driving to the tunable laser, which is a ultra low-ripple voltage driver and consists of a high-precision D/A convertor, a Field programmable Gate array (FPGA) and a low-noise amplifier;

Optical splitter 12 with splitting ratio of 1:99: it splits the emergent light of laser according to the splitting ratio of 1:99, split the light to the core interference module 1 and the laser optical frequency and phase monitoring module 2;

Laser optical frequency and phase monitoring module 2: this module collects and monitors the optical frequency and phase of the laser, which is either Michelson interferometer structure or the Mach-Zehnder interferometer structure based 3×3 coupler (FIG. 3). The depolarized Michelson interferometer comprises isolator 13 that is used for preventing the reflected light of the second port of coupler 15 with the splitting ratio of 50:50 from traveling into the laser. Coupler 15 with the splitting ratio of 50:50 is used for interfering the light. The light goes into the second port of coupler 15 with the splitting ratio of 50:50, and emits from the third and forth port. Then the lights are reflected by Faraday rotating mirrors 17 and 18 mounted on the two arms of the Michelson interferometer respectively, and return to the third and forth port. The two light beams interfere in coupler 15, then the lights output from the first port. Faraday rotating mirrors 17 and 18 provide reflectometry for the interferometer, and eliminate the polarization fading phenomena of the interferometer. Optical delay fiber 16 is used for unequal armed beat-frequency interference, which can obtain the optical frequency according to the beat-frequency and the length of the optical delay fiber. Interference detector 14 is used for collecting the emergent light emitted from the first port of coupler 15, namely the beat-frequency signal of the source optical frequency and phase monitoring module. Phase modulator 19 is used for phase modulating one arm of the interferometer, for phase-lock demodulating the phase of the interference signal. The Mach-Zehnder interferometer structure based 3×3 coupler is shown in FIG. 3, it comprises splitter 33 with ratio of 50:50, which is used for splitting the incident light at ratio of 50:50. Then the lights travel through optical delay fiber 34 into 3×3 coupler 35 for interfering. The two ports of the 3×3 coupler access to the optical interfaces of detectors 36 and 37, respectively, and the collected electric signal is transmitted into the high-speed collecting module.

Core interference module 1: it is the core of the optical frequency domain reflectometry, consisting of tunable polarization-maintaining attenuator 20, polarization-maintaining splitter 21, reference arm, test arm and polarization-maintaining coupler 24; wherein tunable polarization-maintaining attenuator 20 is used for adjusting the light intensity, polarization-maintaining splitter 21 distributes the light to the reference arm and test arm of the interferometer according to the one of the following ratios of 50:50, 20:80, 30:70 or 40:60. A high ratio (e.g. 20:80 or 30:70) is chosen when the testing optical fiber is highly affected by the Brillouin absorption, otherwise a low ratio (e.g. 50:50 or 40:60) is recommended.

The reference arm consists of phase modulator 22 and 45° aligner 23, wherein the reference arm fiber is polarization-maintaining fiber. Phase modulator 22 takes the maximum beat frequency as the modulation frequency, modulates signal via programmable gate array 31, and high-pass filters the collected signal to reduce Rayleigh scattering coherent noises (namely Fading noise) and ghost peaks. The 45° angle aligner 23 is used to align the axis to 45° between two section of the axis of PM fiber to ensure the fast and slow axis of PM fiber on the reference arm having equal light intensity.

The test arm of core interference module 1: it connects to polarization generator 38 of polarization generating module 3. The back scattering light of sensing optical fibers 10 and 11 travel through high-speed optical switch 7 and the circulator of polarization generating module 3 into the second port of polarization-maintaining coupler 24. The reference arm light of core interference module 1 goes into the first port of polarization-maintaining coupler 24. The back scattering light of sensing optical fibers 10 and 11 and the reference arm light form beat-frequency interference in polarization-maintaining coupler 24, and generates beat-frequency signal that goes through the third and forth port of polarization-maintaining coupler 24 into polarization splitting balanced detecting module 4;

Polarization generating module 3: it consists of polarization state generator 38 and circulator 29, wherein polarization state generator 38 generate the light of several fixed polarization state lights, including linear polarized light, 45-degree linear polarized light, left-handed or right-handed circular polarized light; the polarization generator provides existing reference polarization state for following algorithms; the circulator 29 is a dual-axis polarization-maintaining circulator, which is used for connecting polarization generator 38, high-speed optical switch 7 and polarization-maintaining coupler 24 of core interference module 1. The detailed connecting method is as follows: the light goes through the first port of the circulator 29 into the circulator, and goes through the second port of the circulator 29 into high-speed optical switch 7, then the back scattering light of the sensing fibers, connected to the high-speed optical switch returns back through the second port of the circulator, goes through the third port of the circulator into the first and second port of polarization-maintaining coupler 24 of the core interference module 1.

High-speed optical switch 7: it links sensing optical fibers 10 and 11, which enables this system to use several optical fibers, strengthens the sensing distance of the system and establish of large-scale sensing network;

Polarization splitting balanced detecting module 4: it consists of polarization splitters 25 and 26 and balanced detectors 27 and 28; wherein, polarization splitters 25 and 26 split the beat-frequency signal outputted from core interference module 1 into two components of the fast and slow axes with orthogonally polarized property. Wherein, the fast axis component of polarization splitters 25 and 26 goes into the first balanced detector 27, and the slow axis component goes into the second balanced detector 28;

High-speed data acquisition module 8: it is used for collecting the electric signals transmitted from the first balanced detector 27 and the second balanced detector 28 of the polarization splitting balanced detecting module, detector 14 (the first structure) or detectors 36 and 37 (the second structure) of the laseroptical frequency and phase monitoring module.

Computer9: the computer is used to process the digital signal from the high-speed data acquisition module 8, this module function is that process laser optical frequency and phase from laser optical frequency and phase monitoring module 2, demodulating the beat-frequency signal generated by the core interference module 1, and providing control signal to the tunable light source driving module 5.

Sensing optical fibers 10 and 11: the sensing optical fibers are either common communication single-mode fiber or vibrating sensing optical fiber, and The fiber is implement in fence and large-scale civil structures for disturbance monitoring.

Figure 4:
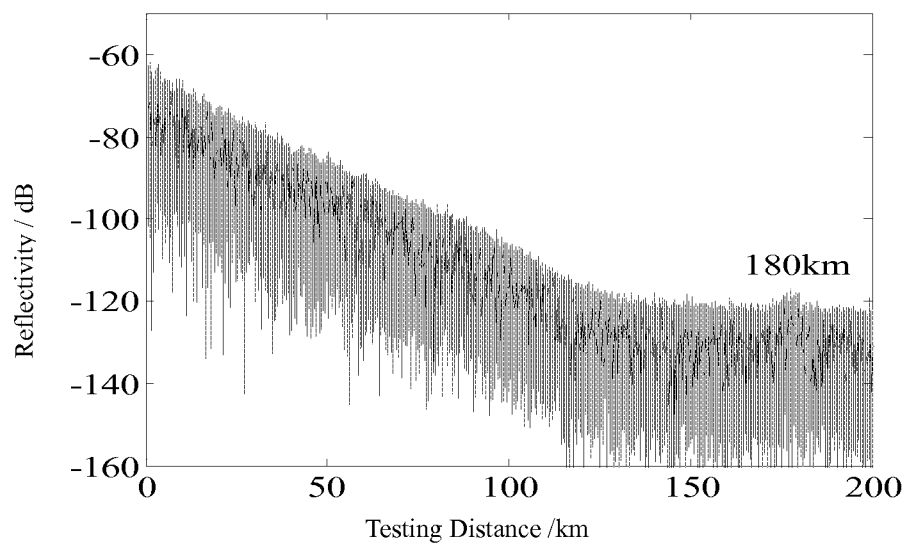
FIG. 4 is the spectrum of the signal not processed by denoising and window technique.
Figure 5:
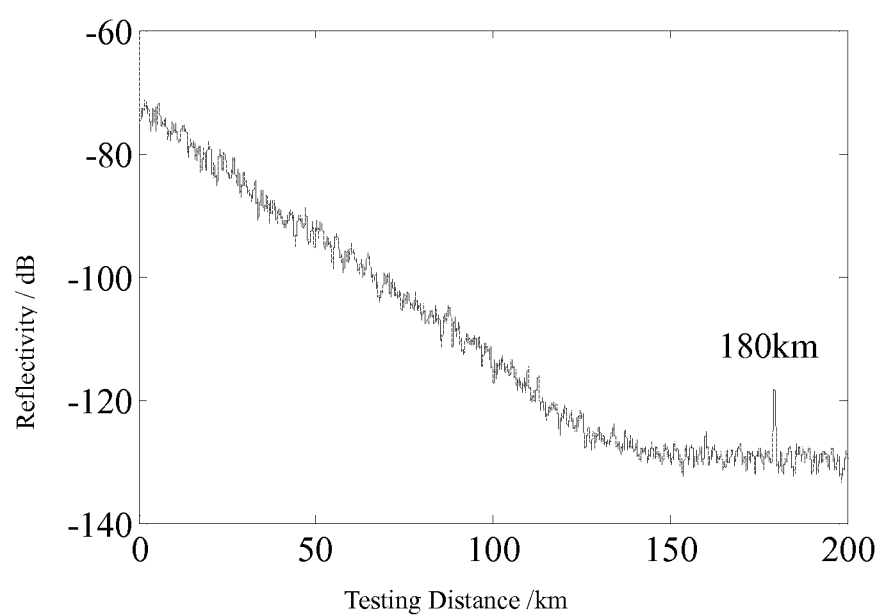
FIG. 5 is the spectrum of the signal which is processed by denoising and window technique.

Embodiment 2 : the demodulation method of distributed disturbing sensing Device Based on P-OFDR Method The detailed technical method and algorithm including the following steps:

Step 1: collecting the real-time optical phase or optical frequency of the laser, performing some data process algorithms such as Hilbert transformation, trigonometric function transformation, and time-frequency domain transformation to process the signal collected by the laser optical frequency and phase monitoring module, in order to obtain the optical frequency or phase information of the laser in each time point;

Step 2: using the signal of the laser's optical frequency and phase signal collected at Step 1, and adopting the compensation algorithm (such as Non-uniform Fast Fourier Transform (NUFFT), phase noise compensation algorithm based on Residual Video Phase filter, etc.) to compensate the two orthogonal polarization signals of the core interference module for reducing the influence on signal-to-noise ratio of the system and the spatial resolution due ro the nonlinear optical frequency and the phase noise of the laser;

Step 3: performing spectral analysis to the signals of the core interference module compensated at Step 2, the spectral analysis is taken by either non-parametric spectral estimation or parametric spectral estimation; the non-parametric spectral estimation is as follows: adopting window function of Kaiser window or Gaussian window to the signal compensated at Step 2 for reducing the side lobes of the signal, then processing the advanced window techniques of convolution window and spatial apodization or apodization; the parametric spectral estimation is as follows: adopting the Auto-Regressive-Moving-Average (ARMA) model or Auto-Regressive model or the other parametric methods such as the multiple signal classification method to the signal compensated at Step 2 for modeling the output signal of the system, thus realizing the super resolution analysis to the system;

Step 4: denoising the signal processed at Step 3, using wavelet denoising, or Wiener deconvolution adaptive denoising, or median denoising, or Morphology denoising, or partial differential denoising, or the denoising based on the local statistical features; FIG. 4 shows the spectrum of the signal not processed by denoising and window technique, and FIG. 5 shows the spectrum of the signal processed by denoising and window technique;

Step 5: adopting either of the following two polarization analysis methods to perform polarization calculation to the signal processed at Step 4, wherein the polarization calculation based on the optical fibers equivalent to multiple wave plates concatenation model:

Method A: The polarization state and Jones vector of the input and output lights are detected by the polarization generator and polarization beam splitter. The eigen value of the Jones Matrix is obtained using similar matrix. Inputting two orthogonal polarization states to the polarization generating module, Jones Matrix of each segment in the testing fiber can be calculated, namely linear birefringence, linear double-attenuation and circular birefringence are obtained;

Method B: the Stokes vector of the input and output lights are detected by the polarization generator and polarization splitter. The distributed Mueller Matrix of the each segment in the testing fiber are obtained after matrix calculation, namely the linear birefringence, linear double-attenuation and the circular birefringence are obtained.

What is claimed is:

1. A distributed disturbance sensing device based on polarization sensitive optical frequency domain reflectometry, comprising:
(a) a tunable laser source selected from the group consisting a tunable fiber laser and an external cavity semiconductor laser;
(b) a laser source driver connected to said tunable laser source;
(c) an optical splitter connected to said tunable laser source;
(d) an optical frequency and phase monitoring member, said optical frequency and phase monitoring member being selected from a group consisting of a depolarized Michelson interferometer and a Mach-Zehnder interferometer based on 3×3 coupler;
- (e) a core interference member, being a core of an optical frequency domain reflectometer, which comprises a tunable polarization-maintaining attenuator, a polarization-maintaining splitter, a reference arm comprising a phase modulator and a 45° aligner, a test arm, and a polarization-maintaining coupler having two output ports;
- (f) a polarization generating module, being part of said test arm of said core interference member and comprising a polarization state generator and a polarization-maintaining circulator;
- (g) a polarization splitting balanced detecting member comprising two polarization splitters and two balanced detectors, said two polarization splitters being connected respectively to said two output ports of said polarization-maintaining coupler in said core interference member;
- (h) a data acquisition member, said data acquisition member further connected to a computer; and
- (i) an optical switcher.

2. The distributed disturbance sensing device according to claim 1, wherein said optical frequency and phase monitoring member is a depolarized Michelson interferometer structure, which comprises an isolator, a coupler with a splitting ratio of 50:50, two Faraday rotating mirrors, a photo detector, an optical delay fiber and a phase modulator.

3. The distributed disturbance sensing device according to claim 1, wherein said optical frequency and phase monitoring member is a Mach-Zehnder interferometer structure based on a 3×3 coupler, which comprises a splitter with a splitting ratio of 50:50, an optical delay fiber, a 3×3coupler and two detectors.

4. A demodulation method for a distributed disturbance sensing device based on polarization sensitive optical frequency domain reflectometry, comprising the following steps:
- (1) collecting optical phase or optical frequency of a laser from a tunable laser source to obtain optical frequency or phase information of the laser at a plurality of time intervals;
- (2) based on the information of optical frequency and phase collected in step (1), compensating two orthogonal polarization signals from a core interference member in order to reduce an influence of nonlinearity of optical frequency and phase noises of the laser on signal-to-noise ratio and spatial resolution;
- (3) performing spectral analysis on the compensated signals of the core interference member by non-parametric or parametric spectral estimation;
- (4) denoising the signals processed in step(3), using one or more procedures selected from the group consisting of wavelet denoising, Wiener deconvolution adaptive denoising, median denoising, morphology denoising, partial differential denoising, and denoising based on local statistical features; and
- (5) performing polarization calculation on the signals processed at step (4) based on optical fibers equivalent to a multiple wave plates concatenation model.

* * * * *